United States Patent
Kim et al.

(10) Patent No.: US 10,710,571 B2
(45) Date of Patent: Jul. 14, 2020

(54) HYBRID VEHICLE AND METHOD OF CONTROLLING RESPONSE TO DRIVING LOAD FOR THE SAME

(71) Applicants: HYUNDAI MOTOR COMPANY, Seoul (KR); KIA MOTORS CORPORATION, Seoul (KR)

(72) Inventors: Sang Joon Kim, Seoul (KR); Young Chul Kim, Seongnam-si (KR); Lee Hyoung Cho, Suwon-si (KR); Dong Ho Yang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 325 days.

(21) Appl. No.: 15/847,541

(22) Filed: Dec. 19, 2017

(65) Prior Publication Data
US 2019/0001961 A1    Jan. 3, 2019

(30) Foreign Application Priority Data
Jun. 30, 2017  (KR) .......................... 10-2017-0083371

(51) Int. Cl.
*B60W 20/16*  (2016.01)
*B60W 40/13*  (2012.01)
(Continued)

(52) U.S. Cl.
CPC .......... *B60W 20/16* (2016.01); *B60W 30/143* (2013.01); *B60W 40/105* (2013.01); *B60W 40/13* (2013.01); *B60W 50/14* (2013.01); *B60W 2050/146* (2013.01); *B60W 2540/10* (2013.01); *B60W 2552/05* (2020.02);
(Continued)

(58) Field of Classification Search
CPC .... B60W 20/16; B60W 40/105; B60W 50/14; B60W 30/143; B60W 40/13; B60W 2720/30; B60W 2550/141; B60W 2550/10; B60W 2550/30; B60W 2550/22; B60W 2550/142; B60W 2540/10; B60W 2720/10; B60W 2050/146; B60W 2550/20; B60W 30/188; B60W 20/10; B60W 20/12; B60W 2050/0027; B60W 2710/1055
See application file for complete search history.

(56) References Cited

U.S. PATENT DOCUMENTS 8,841,996 B2  9/2014  Nakamichi
2009/0157267 A1*  6/2009  Shin .................. B60W 50/0098
701/51

(Continued)

FOREIGN PATENT DOCUMENTS

KR  10-1197457 B1  11/2012
KR  10-1327057 B1  11/2013
(Continued)

*Primary Examiner* — Thomas Ingram
(74) *Attorney, Agent, or Firm* — Morgan, Lewis & Bockius LLP (57) ABSTRACT

A method for controlling a response to driving load of a hybrid vehicle includes: estimating an optimum speed for a current driving situation, estimating a target driving load based on the optimum speed, determining an eco-level corresponding to the target driving load from among a plurality of eco-levels, and changing at least some of an eco-gauge according to the determined eco-level.

15 Claims, 8 Drawing Sheets

(51) Int. Cl.
*B60W 30/14* (2006.01)
*B60W 50/14* (2020.01)
*B60W 40/105* (2012.01)

(52) U.S. Cl.
CPC ..... *B60W 2552/15* (2020.02); *B60W 2554/00* (2020.02); *B60W 2554/80* (2020.02); *B60W 2555/60* (2020.02); *B60W 2720/10* (2013.01); *B60W 2720/30* (2013.01); *Y10S 903/93* (2013.01)

(56) References Cited

U.S. PATENT DOCUMENTS

| | | | | |
|---|---|---|---|---|
| 2010/0073158 | A1* | 3/2010 | Uesaka | B60Q 9/00 340/450.2 |
| 2010/0082228 | A1* | 4/2010 | Lee | B60R 16/0236 701/123 |
| 2012/0022764 | A1* | 1/2012 | Tang | B60W 10/06 701/102 |
| 2014/0032062 | A1* | 1/2014 | Baer | G07C 5/08 701/51 |
| 2015/0046029 | A1* | 2/2015 | Kosaka | B60K 37/02 701/36 |
| 2015/0353034 | A1* | 12/2015 | Jang | G07C 5/004 701/101 |

FOREIGN PATENT DOCUMENTS

| | | |
|---|---|---|
| KR | 10-1417102 B1 | 7/2014 |
| WO | 2011/030444 A1 | 3/2011 |

* cited by examiner

FIG. 1

- PRIOR ART -

HYBRID VEHICLE AND METHOD OF CONTROLLING RESPONSE TO DRIVING LOAD FOR THE SAME

This application claims the benefit of priority to Korean Patent Application No. 10-2017-0083371, filed on Jun. 30, 2017, which is hereby incorporated by reference as if fully set forth herein.

TECHNICAL FIELD

The present disclosure relates to a hybrid vehicle and a method for controlling the same, and more particularly, to a hybrid vehicle for controlling a power gauge and output characteristics according to a driving load and a method for controlling the same.

BACKGROUND

Recently, hybrid electric vehicles (HEVs) have much drawn attention as eco-friendly vehicles.

Typically, a hybrid electric vehicle (HEV) refers to a vehicle that uses two power sources together. The two power sources are mainly an engine and an electric motor. HEVs are recently under vigorous development because HEVs are superior to vehicles provided with an internal combustion engine alone in terms of fuel efficiency, power performance, and exhaust gas reduction. Among HEVs, in the case of a plug-in hybrid electric vehicle (PHEV), a plug is connected to the PHEV and thus a battery to drive an electric motor may be charged with external power.

The HEV may include a cluster provided with a gauge (hereinafter referred to as an eco-gauge for convenience of description) for indicating whether an electric motor charges a battery or drives wheels, and a degree of corresponding action. The eco-gauge may be a dial-type gauge or a bar-type gauge. The eco-gauge may acquire information regarding the position of a needle to be used for measurement from a hybrid controller. The hybrid controller may be a high-order controller to be used for overall control of a powertrain of a hybrid electric vehicle (HEV).

A structure and problems of the eco-gauge will hereinafter be described with reference to FIG. 1.

Figure 1:
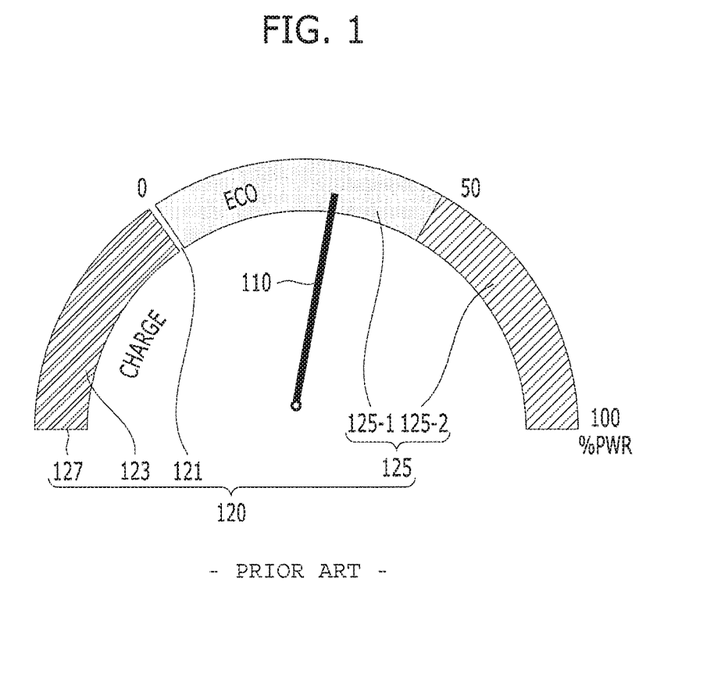
FIG. 1 is a view illustrating a structure and problems of a dial-type gauge of a general hybrid electric vehicle (HEV).

FIG. 1 is a view illustrating the structure and problems of a dial-type gauge of a general hybrid electric vehicle (HEV).

Referring to FIG. 1, an eco-gauge 100 of the HEV may mainly include a needle 110 and a gauge region 120 in which the needle 100 moves. The gauge region 120 may include a charging region 123 indicating charging of the motor, and a driving region 125 indicating driving of the motor. The charging region 123 and the driving region 125 may be respectively disposed at left and right sides with respect to a zero point 121. If engine ignition is turned off (IG OFF), the needle 110 may stay at the lowest point 127. In this case, the driving region may be classified into an eco-region 125-1 and a power region 125-1. If the powertrain operates in the range of a high-efficiency operating point, the needle 110 is located in the eco-region 125-1. The needle 100 may gradually move toward the power region 125-2 in proportion to the increasing output of the powertrain. Therefore, the eco-region 125-1 may enable a vehicle driver to drive a vehicle with fuel efficiency while simultaneously recognizing the position of the needle 110.

However, the eco-region 125-1 is fixed in size or position, irrespective of a vehicle driving state. In fact, although the range of a high-efficiency operating point of the powertrain is changed, the vehicle driver who uses the aforementioned dial-type gauge is unable to recognize change of the high-efficiency-driving-point range.

SUMMARY

The present disclosure is directed to a hybrid vehicle and a method for controlling a response to a driving load for the same that substantially obviate one or more problems due to limitations and disadvantages of the related art.

An object of the present disclosure is to provide a hybrid vehicle for more efficiently providing information through an eco-gauge, and a method for controlling the same.

Another object of the present disclosure is to provide a hybrid vehicle for controlling a power gauge and output characteristics in response to a driving load, and a method for controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a response to a driving load of a hybrid vehicle includes estimating, by a hybrid controller, an optimum speed for a current driving situation; estimating, by the hybrid controller, a target driving load based on the optimum speed; determining, by the hybrid controller, an eco-level corresponding to the target driving load from among a plurality of eco-levels; and changing, by a cluster controller, at least some of an eco-gauge according to the determined eco-level.

In accordance with another aspect of the present disclosure, a hybrid vehicle includes: an information acquisition processor configured to acquire information regarding a current driving situation; a hybrid controller configured to estimate an optimum speed for the current driving situation using the information received from the information acquisition processor, to estimate a target driving load based on the optimum speed, and to determine an eco-level corresponding to the target driving load from among a plurality of eco-levels; and a cluster controller configured to change at least some of an eco-gauge according to the determined eco-level.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF SPECIFIC EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts. In the following description, the suffixes "module" and "unit" contained in terms of constituent elements to be described will be selected or used together in consideration only of the convenience of writing the following specification, and the suffixes "module" and "unit" do not necessarily have different meanings or roles.

In the following description, known functions or structures, which may confuse the substance of the present disclosure, are not explained. While the present disclosure permits a variety of modifications and changes, specific embodiments of the present disclosure illustrated in the drawings will be described below in detail. However, the detailed description is not intended to limit the present disclosure to the described specific forms. Rather, the present disclosure includes all modifications, equivalents, and substitutions without departing from the spirit of the invention as defined in the claims.

A hybrid electric vehicle (HEV) according to one embodiment of the present disclosure may estimate an optimum speed and a target driving load according to a driving environment, and may decide an eco-level based on the estimated optimum speed and target driving load, such that the HEV can change or modify a structure of an eco-gauge according to the decided eco-level or can control driving torque.

In this case, the eco-level may be classified into at least two stages according to the estimated target driving load. In the following embodiments of the present disclosure, it is assumed that the eco-level is classified into a default level corresponding to a first stage, a low-load level corresponding to a second stage, and an extremely-low-load level corresponding to a third stage. For example, the low-load level may correspond to driving load, such as, a downhill road, a congested section, a curved road, a ramp, and an exit driving situation. The extremely-low-load level may correspond to driving load, such as, a rapid descent, a sharp bend, a speed bump, the presence of an object in a forward region (e.g., another vehicle approaching the forward region), etc.

However, the above-mentioned levels are only exemplary, and the scope or spirit of the present disclosure is not limited to the number of levels. First of all, an overall vehicle control process, for example, a process for deciding an eco-level, a process for changing an eco-gauge structure based on the decided eco-level, and/or a process for controlling drive torque characteristics based on the decided eco-level, will hereinafter be described with reference to FIG. 2.

Figure 2:
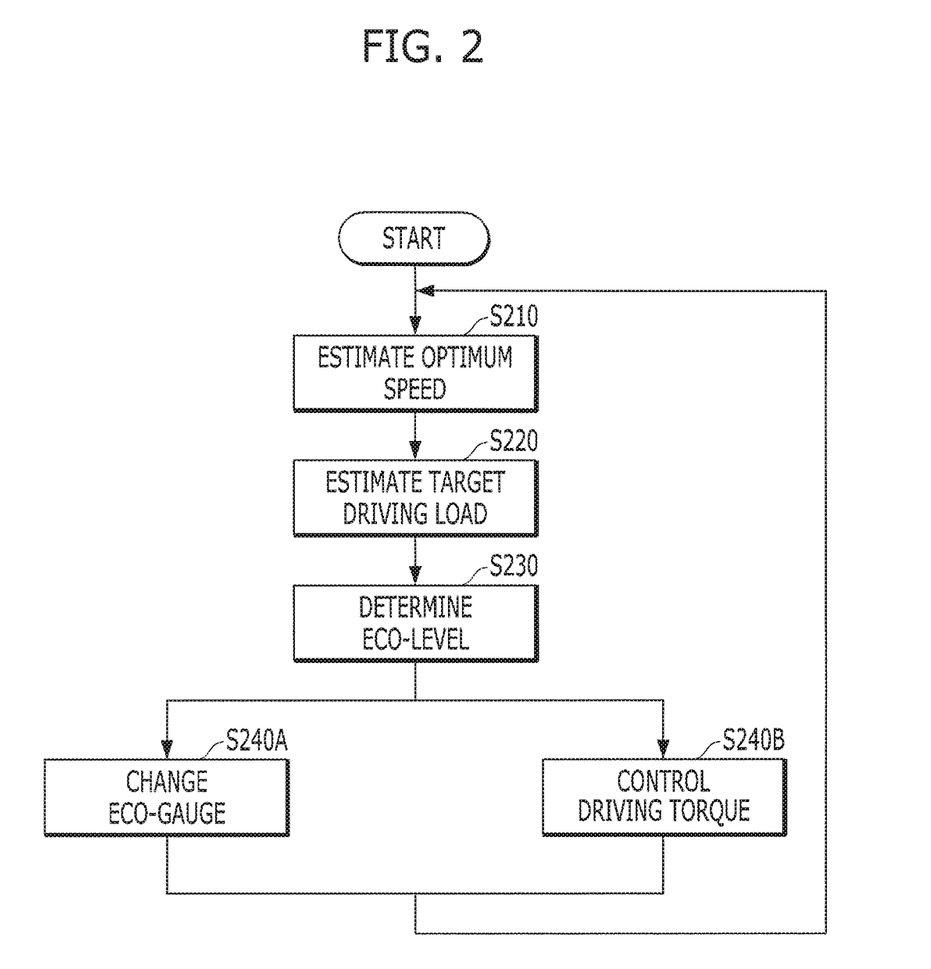
FIG. 2 is a flowchart illustrating a method for controlling a vehicle in response to an eco-level according to an embodiment of the present disclosure.

FIG. 2 is a flowchart illustrating a method for controlling a vehicle in response to an eco-level according to an embodiment of the present disclosure.

Referring to FIG. 2, it may be possible to estimate an optimum speed indicating a vehicle speed having optimum efficiency in consideration of a current driving situation (S210). When estimating the optimum speed, it may be possible to consider various kinds of information (e.g., a cruising fuel-efficiency, a gradient, traffic congestion, a speed limit, a road type, information regarding a vehicle/obstacle present in a forward region, etc.) to which air-conditioning load and hybrid powertrain characteristics are applied.

A detailed method for estimating an optimum speed will be described later with reference to FIG. 3.

It may be possible to estimate a target driving load using the estimated optimum speed and gradient information of a current driving road (S220).

In consideration of the relationship between the target driving load and the eco-level, the resultant eco-level may be decided (S230).

The relationship between the target driving load and the eco-level will hereinafter be described with reference to FIG. 5.

If the eco-level is decided, the structure of the eco-gauge may be changed based on the decided eco-level (S240A), or drive torque control may be carried out (240B).

The above-mentioned steps will hereinafter be described with reference to FIGS. 3 to 8.

Figure 3:
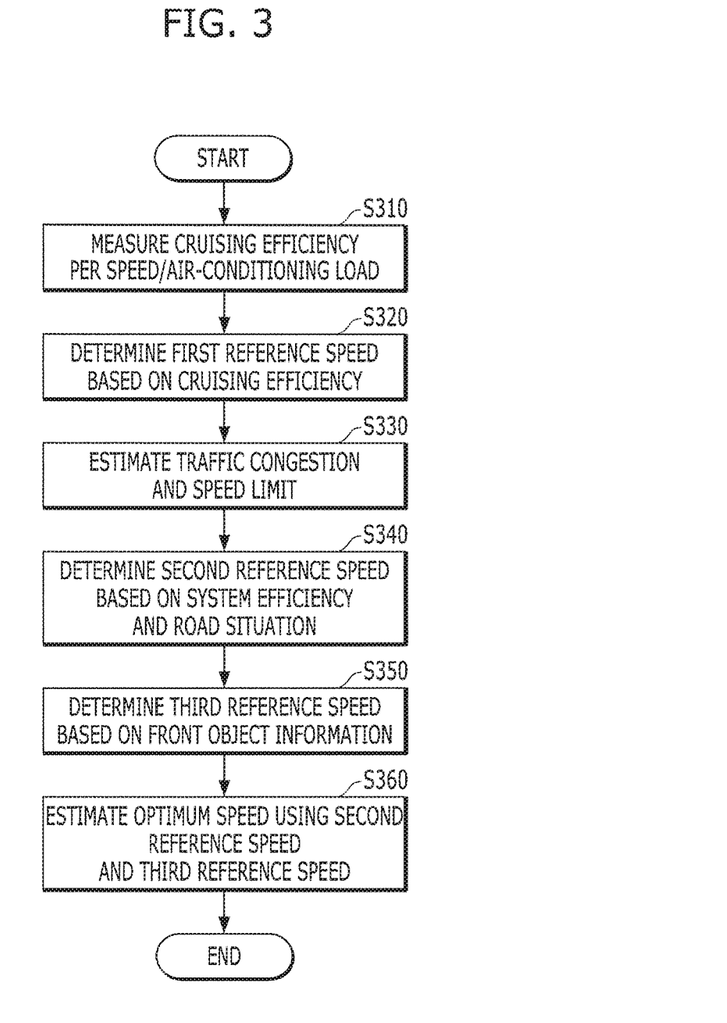
FIG. 3 is a flowchart illustrating a method for estimating an optimum speed of a hybrid electric vehicle (HEV) according to an embodiment of the present disclosure.

FIG. 3 is a flowchart illustrating a method for estimating an optimum speed of a hybrid electric vehicle (HEV) according to an embodiment of the present disclosure.

Referring to FIG. 3, cruising fuel-efficiency for each speed or for each air-conditioning load may be measured (S310), and a first reference speed based on the cruising fuel-efficiency of the powertrain may be decided (S320). That is, the first reference speed may refer to an economical speed (e.g., cruising speed) for each air-conditioning load operating state. In this case, for the fuel efficiency measurement step S310, an actual vehicle testing method or a simulation method may be used.

Subsequently, the degree of traffic congestion and the speed limit may be estimated (S330). When estimating the degree of traffic congestion, the degree of traffic congestion may be converted into an average speed on a road using traffic information of a navigation system, and a communication delay may be compensated on the basis of traffic information of the navigation system in the situation in which a radar of an advanced driver assistance system (ADAS) is available. In addition, the speed limit may be estimated based on navigation information, and the mapping method for each road type on the basis of the presence or absence of the speed limit may also be applied to such speed limit estimation as necessary.

When the degree of traffic congestion, the speed limit, the road type, and the first reference speed information are acquired, it may be possible to decide a secondary reference speed in consideration of system efficiency and road situation by combination of the acquired information (S340). The second reference speed may be a vehicle speed having the best fuel efficiency on the basis of the cruising control driving in the corresponding road environment.

Figure 4:
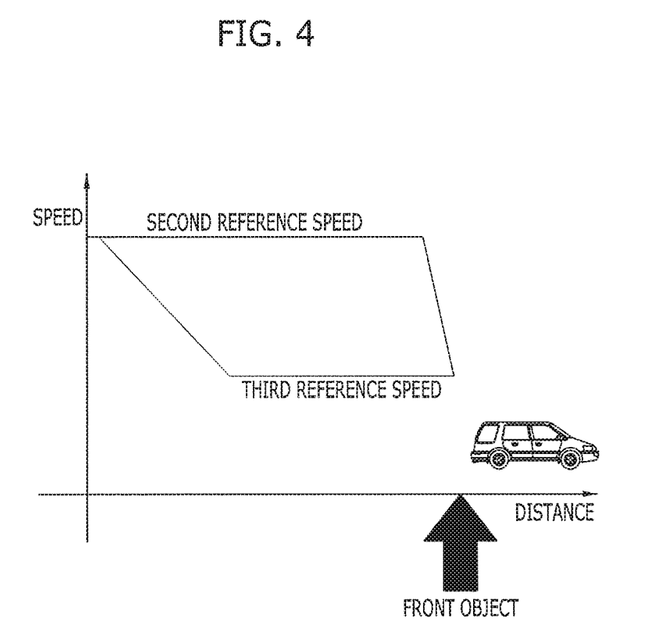
FIG. 4 is a conceptual diagram illustrating a third reference speed according to an embodiment of the present disclosure.

In addition, through compensation of a transient status according to information of a front object (e.g., other vehicle, a speed camera, a speed bump, switching direction, a crossroad, a tollgate, etc.), a third reference speed corresponding to a target speed for preventing unnecessary acceleration or abrupt deceleration of the vehicle (S350). For example, as shown in FIG. 4, when vehicle driving is maintained at the second reference speed, the vehicle must come to a sudden stop due to impending obstacles. However, if the vehicle slowly decelerates to a third reference speed in advance, frictional braking caused by excessive deceleration can be prevented, such that regenerative braking can be efficiently performed during deceleration of the vehicle.

Referring back to FIG. 3, if the second reference speed and the third reference speed are decided, the final optimum speed may be estimated using the decided second and third reference speeds (S360). For example, the optimum speed may be a lower one of two reference speeds (i.e., the second reference speed and the third reference speed).

A method for deciding an eco-level will hereinafter be described with reference to FIG. 5.

Figure 5:
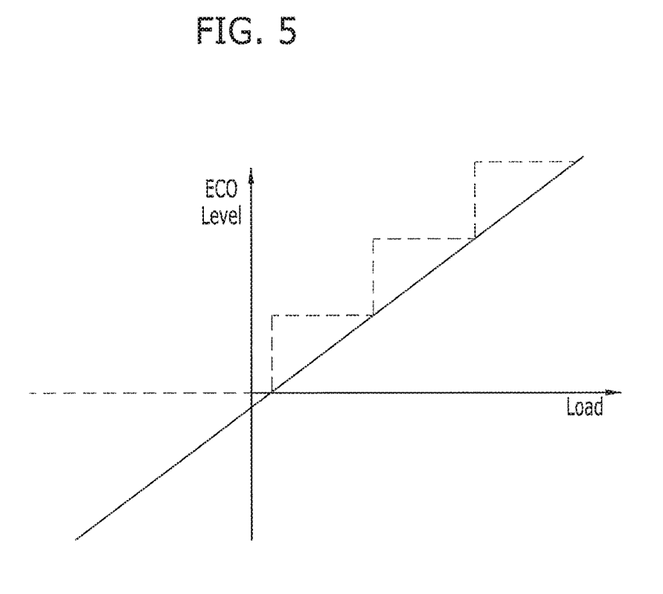
FIG. 5 is a graph illustrating an example of correlation between a target driving load and an eco-level according to an embodiment of the present disclosure.

FIG. 5 is a graph illustrating an example of correlation between a target driving load and an eco-level according to an embodiment of the present disclosure. Referring to FIG. 5, different eco-levels may be matched to respective target driving load sections. The correlation of FIG. 5 is only exemplary, and a larger number of eco-levels or a smaller number of eco-levels may be established.

A detailed example for changing the structure of the eco-gauge based on an eco-level will hereinafter be described with reference to FIGS. 6A-7C.

Figure 6A:
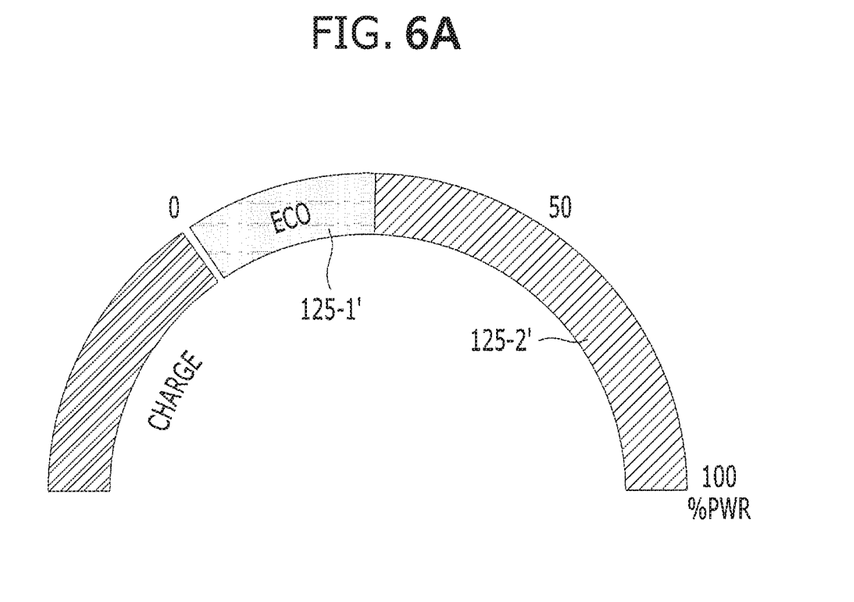
FIGS. 6A and 6B are views illustrating an example of a modified structure of a dial-type eco-gauge according to an embodiment of the present disclosure.
Figure 6B:
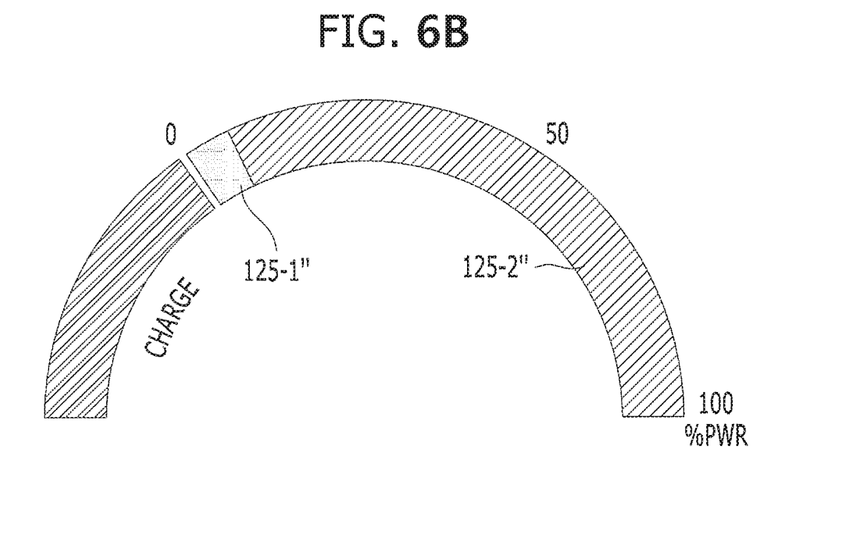

FIGS. 6A and 6B are views illustrating an example of a modified structure of a dial-type eco-gauge according to an embodiment of the present disclosure.

If the eco-level is at a default level, the structure of FIG. 1 is achieved. In contrast, if the eco-level is at a low-load level, an eco-region 125-1' may be reduced in size as shown in FIG. 6A, such that a power region 125-2' may increase in size by the reduced size. In addition, if the eco-level is at an extremely-low-load level, the eco-region 125-1" may be further reduced in size and the power region 125-2" may be further increased in size, as shown in FIG. 6B. As a result, as the driving load becomes smaller, the eco-region becomes smaller in size, such that unnecessary acceleration caused by the vehicle driver can be prevented from occurring.

The above-mentioned eco-gauge modification may also be applied to the bar-type eco-gauge, and a detailed description thereof will hereinafter be described with reference to FIGS. 7A-7C.

Figure 7A:
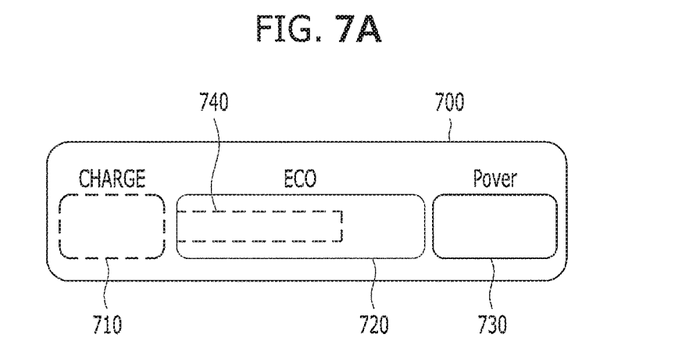
FIGS. 7A to 7C are views illustrating modified examples of a bar-type eco-gauge according to an embodiment of the present disclosure.
Figure 7B:
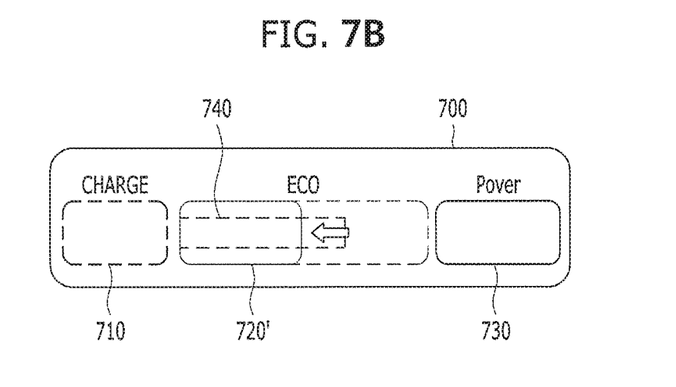
Figure 7C:
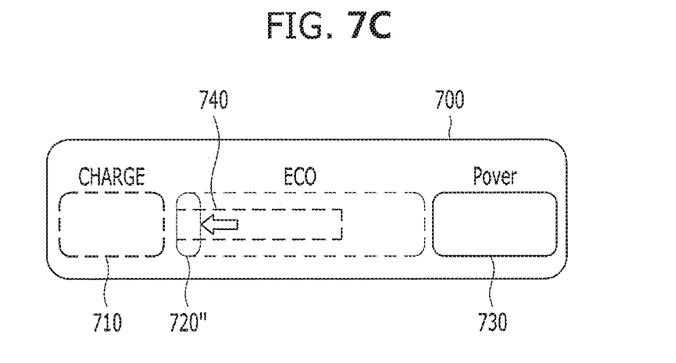

FIGS. 7A to 7C are views illustrating modified examples of the bar-type eco-gauge according to an embodiment of the present disclosure.

Referring to FIG. 7A, the bar-type eco-gauge 700 is shown. Whereas the eco-gauge 700 may include a charge region 710, an eco-region 720, and a power region 730 in a similar way to the dial-type eco-gauge, the eco-gauge 700 may display a bar 740 instead of the needle in a different way from the dial-type eco-gauge. The eco-gauge shown in FIG. 7A may correspond to the case of the default level.

If the eco-level is at the low-load level, an eco-region 720' may be reduced in size as illustrated in FIG. 7B. If the eco-level is at the extremely-low-load level, the eco-region 720" may be further reduced in size as illustrated in FIG. 7C.

Torque control based on the eco-level will hereinafter be described with reference to FIG. 8.

Figure 8A:
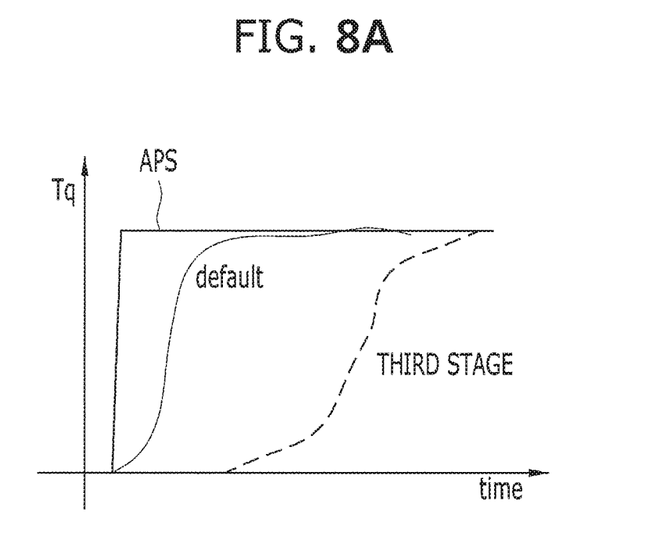
FIGS. 8A and 8B are views illustrating examples of torque control based on an eco-level according to an embodiment of the present disclosure.
Figure 8B:
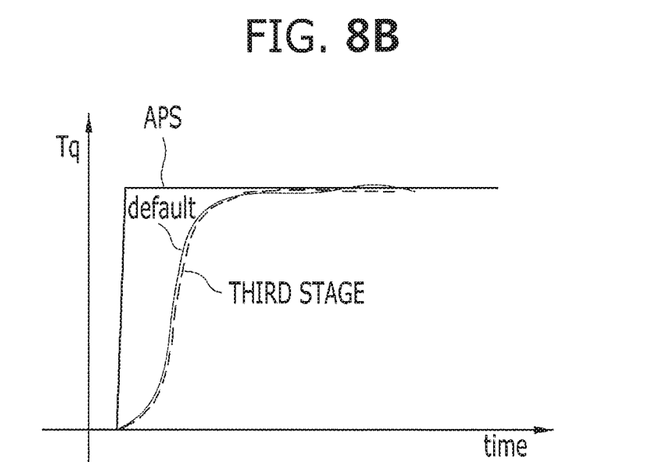

FIGS. 8A and 8B are views illustrating examples of torque control based on the eco-level according to an embodiment of the present disclosure.

Referring to FIGS. 8A and 8B, in response to an accelerator pedal sensor (APS) value, a plurality of torque variation lines over time may be prepared. Among the torque variation lines, the default line may be applied to each of a first stage eco-level and a second-stage eco-level. A third-stage line may have a lower rate of torque increase for the same APS operating amount as compared to the default line, and may be applied to the case of the third-stage eco-level. Therefore, if the eco-level is at the third stage, a hybrid controller may perform torque control in response to the third-stage line. As a result, although the same APS value is inputted, the output increase is delayed, such that the output level can be prevented from being unnecessarily increased in the extremely-low-load situation.

When the eco-gauge structure is changed to another, not only information as to whether a notification message indicating the changed eco-gauge will be output, but also other information as to whether torque control based on an eco-level will be executed, may be decided through a user selection menu (USM).

A vehicle structure for performing the above-mentioned steps will hereinafter be described with reference to FIG. 9.

Figure 9:
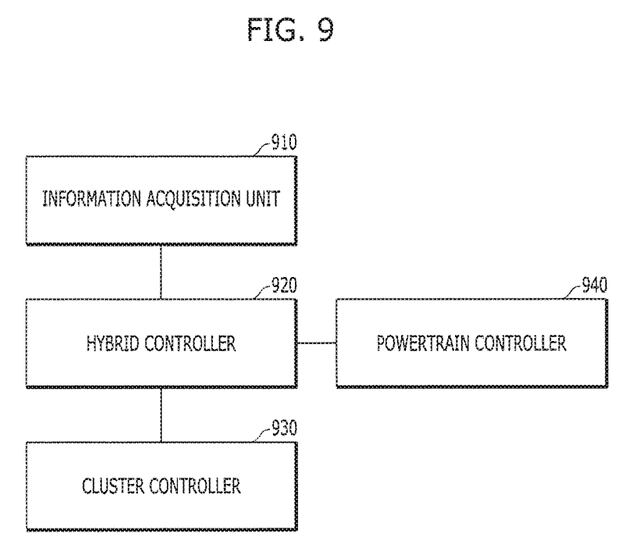
FIG. 9 is a block diagram illustrating an example of a vehicle structure according to an embodiment of the present disclosure.

FIG. 9 is a block diagram illustrating an example of a vehicle structure according to an embodiment of the present disclosure.

Referring to FIG. 9, a hybrid electric vehicle (HEV) according to an embodiment of the present disclosure may include an information acquisition processor 910, a hybrid controller 920, a cluster controller 930, and a powertrain controller 940. According to an example of implementation, at least some of the structure shown in FIG. 9 will herein be omitted from the HEV or many more constituent elements may be included in the HEV.

The information acquisition processor 910 may include at least one of a navigation system, a vehicle speed sensor, an acceleration sensor, or a gyro sensor, each of which is capable of acquiring various kinds of information (e.g., a gradient, traffic congestion, a speed limit, a road type, a front obstacle, etc.).

The hybrid controller 920 may perform steps S210 to S230 and another step S240B shown in FIG. 2 not only using information acquired from the information acquisition processor 910, but also using pre-stored cruising fuel-efficiency information. Specifically, in order to perform the step S240B, the hybrid controller 920 may perform a necessary operation by referring to the plurality of torque lines such that the hybrid controller 920 may transmit a torque instruction to the powertrain controller 940.

The cluster controller 930 may acquire eco-level information from the hybrid controller 920, and may thus change the eco-gauge structure in response to the acquired eco-level information.

The powertrain controller 940 may include at least one of an engine controller, a motor controller, or a clutch controller according to a powertrain structure of the HEV.

The above-mentioned embodiments of the present disclosure may be implemented as code that can be written to a computer-readable recording medium and can thus be read by a computer. The computer-readable recording medium may be any type of recording device in which data can be stored in a computer-readable manner. Examples of the computer-readable recording medium include an HDD (Hard Disk Drive), an SSD (Solid State Drive), an SDD (Silicon Disc Drive), a ROM, a RAM, a CD-ROM, a magnetic tape, a floppy disk, optical data storage, etc.

As is apparent from the above description, at least one embodiment of the present disclosure has the following effects.

The embodiment of the present disclosure can more efficiently change a structure of the eco-gauge in response to driving load, thereby informing a vehicle driver of information regarding the high-efficiency operating point.

In addition, the embodiment of the present disclosure can prevent unnecessary acceleration by changing drive torque characteristics in response to driving load.

The recording media readable by the computer may be distributed to computer systems connected to each other through a network such that code readable by the computer is stored or executed in a distributed manner. In addition, a functional program, code, and code segments for embodying the above method may be easily reasoned by programmers in the art to which the disclosure pertains.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for controlling a response to a driving load of a hybrid vehicle, comprising steps of:
   estimating, by a hybrid controller, an reference speed for a current driving situation;
   estimating, by the hybrid controller, a target driving load based on the reference speed;
   determining, by the hybrid controller, an eco-level corresponding to the target driving load from among a plurality of eco-levels; and
   changing, by a cluster controller, at least part of an eco-gauge according to the determined eco-level,
   wherein the step of estimating the reference speed comprises;
   determining a first reference speed in consideration of cruising efficiency,
   determining a second reference speed in consideration of the first reference speed, traffic congestion, and a speed limit,
   determining a third reference to speed based on information regarding a front object, and
   estimating the reference speed by selecting a lower value among the second reference speed and the third reference speed.

2. The method according to claim 1, further comprising a step of:
   changing, by the hybrid controller, an acceleration torque gradient depending on an accelerator pedal sensor (APS) value, in response to the determined eco-level.

3. The method according to claim 2, wherein:
   the acceleration torque gradient decreases as the determined eco-level becomes closer to a low driving load which has a lower driving load than the target driving load.

4. The method according to claim 1, wherein the cruising efficiency is determined according to a size of air-conditioning load and characteristics of a hybrid powertrain.

5. The method according to claim 1, wherein the step of changing the at least part of the eco-gauge comprises:
   changing a size of an eco-region of the eco-gauge according to the determined eco-level.

6. The method according to claim 5, wherein the size of the eco-region is reduced as the determined eco-level becomes closer to a low driving load which has a lower driving load than the target driving load.

7. The method according to claim 1, wherein the target driving load is estimated using the reference speed and gradient information.

8. A non-transitory computer-readable recording medium having recorded thereon a program for executing a method comprising,
   estimating an reference speed for a current driving situation;
   estimating a target driving load based on the reference speed;
   determining an eco-level corresponding to the target driving load from among a plurality of eco-levels; and
   changing at least part of an eco-gauge according to the determined eco-level,
   wherein the step of estimating the reference speed comprises;
   determining a first reference speed in consideration of cruising efficiency,
   determining a second reference speed in consideration of the first reference speed, traffic congestion, and a speed limit,
   determining a third reference speed based on information regarding a front object, and
   estimating the reference speed by selecting a lower value among the second reference speed and the third reference speed.

9. A hybrid vehicle, comprising:
   an information acquisition processor configured to acquire information regarding a current driving situation;
   a hybrid controller configured to estimate an reference speed for the current driving situation using the information received from the information acquisition processor, to estimate a target driving load based on the reference speed, and to determine an eco-level corresponding to the target driving load from among a plurality of eco-levels; and
   a cluster controller configured to change at least part of an eco-gauge according to the determined eco-level,
   wherein the hybrid controller;
   determines a first reference speed in consideration of cruising efficiency,
   determines a second reference speed in consideration of the first reference speed, traffic congestion and a speed limit,
   determines a third reference speed based on information regarding a front object, and
   estimates the reference speed by selecting a lower value among the second reference speed and the third reference speed.

10. The hybrid vehicle according to claim 9, wherein the hybrid controller changes an acceleration torque gradient depending on an accelerator pedal sensor (APS) value, in response to the determined eco-level.

11. The hybrid vehicle according to claim 10, wherein: the acceleration torque gradient decrease as the determined eco-level becomes closer to a low driving load which has a lower driving load than the target driving load.

12. The hybrid vehicle according to claim 9, wherein the cruising efficiency is determined according to a size of air-conditioning load and characteristics of a hybrid powertrain.

13. The hybrid vehicle according to claim 9, wherein the cluster controller changes a size of an eco-region of the eco-gauge according to the determined eco-level.

14. The hybrid vehicle according to claim 13, wherein the size of the eco-region is reduced as the determined eco-level becomes closer to a low driving load which has a lower driving load than the target driving load.

15. The hybrid vehicle according to claim 9, wherein the hybrid controller estimates the target driving load using the reference speed and gradient information.

* * * * *